United States Patent
Diederichs et al.

(10) Patent No.: US 11,780,220 B2
(45) Date of Patent: Oct. 10, 2023

(54) METHOD FOR PHOTOGRAPHICALLY MAPPING AN OBJECT AND PRINTING PRESS COMPRISING A SYSTEM FOR CARRYING OUT THIS METHOD COMPRISING A CONTROL UNIT

(71) Applicant: KOENIG & BAUER AG, Würzburg (DE)

(72) Inventors: Carsten Diederichs, Lemgo (DE);
Ingmar Hohmann, Hövelhof (DE);
Christian Lüder, Bielefeld (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 17/923,634

(22) PCT Filed: Jun. 1, 2021

(86) PCT No.: PCT/EP2021/064640
§ 371 (c)(1),
(2) Date: Nov. 7, 2022

(87) PCT Pub. No.: WO2022/037815
PCT Pub. Date: Feb. 24, 2022

(65) Prior Publication Data
US 2023/0120074 A1    Apr. 20, 2023

(30) Foreign Application Priority Data
Aug. 18, 2020  (DE) ............. 10 2020 121 617.3

(51) Int. Cl.
*B41F 33/00*    (2006.01)
*G01N 21/88*    (2006.01)
*G01N 21/89*    (2006.01)

(52) U.S. Cl.
CPC ..... *B41F 33/0036* (2013.01); *G01N 21/8806* (2013.01); *G01N 21/89* (2013.01)

(58) Field of Classification Search
CPC .. B41F 33/0036; G01N 21/8806; G01N 21/89
See application file for complete search history.

(56) References Cited

U.S. PATENT DOCUMENTS

| 10,621,805 | B1 * | 4/2020 | Kwok | G07D 7/121 |
| 2006/0238830 | A1 * | 10/2006 | Dikeman | H04N 1/484 |
| | | | | 358/509 |

(Continued)

FOREIGN PATENT DOCUMENTS

| DE | 102013223852 A1 | 5/2015 |
| DE | 202015104751 U1 | 9/2015 |

(Continued)

OTHER PUBLICATIONS

International Search Report of PCT/EP2021/064640 dated Aug. 19, 2021.

*Primary Examiner* — David H Banh
(74) *Attorney, Agent, or Firm* — MATTINGLY & MALUR, PC

(57) ABSTRACT

In some examples, photographic mapping of an object takes place during transport at a fixed position by means of a line camera in a sequence of recording periods. An exposure device is exposed for an exposure time that is dependent on the duration of the on-time of the line camera. Each strip-shaped portion of the object to be photographically mapped is exposed, within a recording period, asynchronously for the duration of a first exposure time to white light and for the duration of a second exposure time either to ultraviolet light or to IR light. Each strip-shaped portion of the print image to be photographically mapped is alternately exposed by the exposure device, within the recording period photographi- (Continued)

cally mapping the portion, to white light and either to UV light or to IR light during the duration of the on-time of the line camera.

12 Claims, 1 Drawing Sheet

(56) References Cited

U.S. PATENT DOCUMENTS

| | | | | |
|---|---|---|---|---|
| 2007/0274567 A1* | 11/2007 | Schaede | ............... | G07D 7/0034 |
| | | | | 382/112 |
| 2013/0188065 A1* | 7/2013 | Wegener | .............. | H04N 23/661 |
| | | | | 348/207.99 |
| 2015/0040785 A1* | 2/2015 | Turke | ....................... | G01J 3/501 |
| | | | | 101/171 |
| 2017/0308876 A1* | 10/2017 | Inglis | .................... | G07F 19/202 |
| 2019/0362580 A1* | 11/2019 | Wendt | .................... | G06V 40/40 |

FOREIGN PATENT DOCUMENTS

| | | |
|---|---|---|
| DE | 202014105096 U1 | 1/2016 |
| EP | 1607220 A2 | 12/2005 |
| EP | 3312595 A1 | 4/2018 |

\* cited by examiner

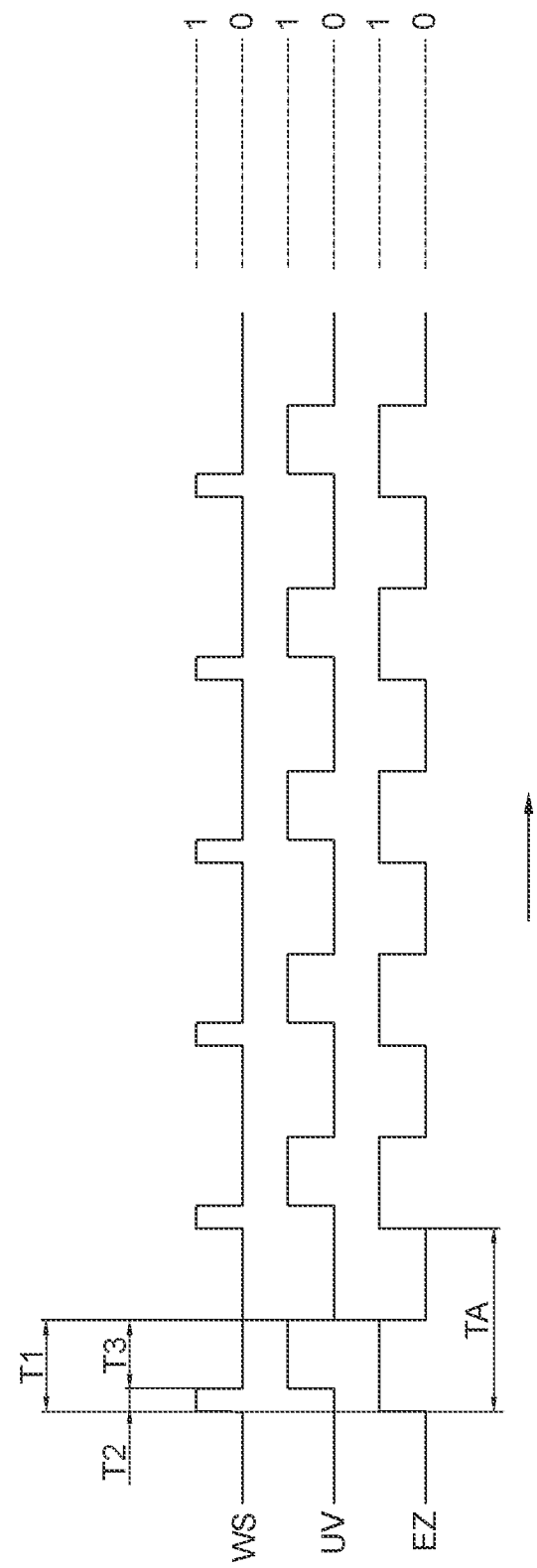

METHOD FOR PHOTOGRAPHICALLY MAPPING AN OBJECT AND PRINTING PRESS COMPRISING A SYSTEM FOR CARRYING OUT THIS METHOD COMPRISING A CONTROL UNIT

CROSS-REFERENCES TO RELATED APPLICATIONS

This application is the US national phase, under 35 USC § 371, of PCT/EP2021/064640, filed on Jun. 1, 2021, published as WO 2022/037815 A1 on Feb. 24, 2022, and claiming priority to DE 10 2020 121 617.3, filed Aug. 18, 2020, the disclosures of which are expressly incorporated by reference herein in their entireties.

TECHNICAL FIELD

Examples herein relate to a method for photographically mapping an object in which the photographic mapping of the object takes place during transport of the object at a fixed position by means of a line camera in a sequence of recording periods that each include at least one image line. The line camera is switched on within each recording period by a control unit for a duration of a defined on-time. Each image line photographically maps a respective strip-shaped portion of the object extending transversely to the transport direction of the object. Each strip-shaped portion of the object to be photographically mapped is exposed for an exposure time by an exposure device, which extends transversely to the transport direction of the object. The exposure device is controlled by the control unit and is located on the same side of the printing substrate as the line camera. Each strip-shaped portion of the object to be photographically mapped is exposed, within the recording period photographically mapping the portion, during the duration of the on-time of the line camera to white light or to UV light or to IR light. A print image that is applied onto a printing substrate in a printing press is used as the object. The photographic recording of the print image takes place while the printing substrate is being transported through the printing press. The print image, in addition to at least one image element that is printed with a printing ink visible to the human eye, includes at least one further image element. This further image element is printed by means of a UV-reactive printing ink or by means of an IR-reactive printing ink, and/or the print image includes at least one UV-reactive security feature or one IR-reactive security feature.

Examples herein further relate to a printing press comprising a system for carrying out the method herein, the printing press including a control unit configured to carry out the method. The system includes a line camera arranged in the printing press and an exposure device. The line camera and the exposure device are directed at a transport path of a printing substrate, which is being transported through the printing press and printed there in at least one printing unit, and are arranged on the same side of this printing substrate.

BACKGROUND

It is known from EP 3 312 595 A1 to take a first picture of a first portion of a material web with a camera at a first point in time, and then take a second picture of a second portion of the material with the camera at a second point in time, wherein the material web is illuminated with a first type of lighting for the first picture and with a second type of lighting for the second picture.

An inspection device for inspecting products arranged on a material web that is guided by a guidance unit is known from DE 20 2015 104 751 U1, wherein the material web has a front side, on which the products can be arranged, and a rear side arranged opposite the front side, comprising a camera including a focus area, a first illumination unit, a second illumination unit, and a trigger unit for triggering an image acquisition function of the camera, an illumination function of the first illumination unit and an illumination function of the second illumination unit, the trigger unit being configured such that, when the camera is arranged in such a way at the material web that the material web can be guided in the focus area and the front side of the material web faces the focus area of the camera, the first illumination unit is arranged in such a way that, in the focus area, the front side can be illuminated by the first illumination unit, and the second illumination unit is arranged in such a way that, in the focus area, the rear side can be illuminated by the second illumination unit, the image acquisition function of the camera, the illumination function of the first illumination unit and the illumination function of the second illumination unit can be triggered in such a way that, when the image acquisition function of the camera is triggered, the focus area can be illuminated by at least one active illumination unit from the group of the first illumination unit and the second illumination unit.

A camera for detecting objects in a detection zone is known from DE 20 2014 105 096 U1, wherein the camera comprises a light receiver including a multiplicity of light reception pixels, a multispectral illumination unit for illuminating the detection zone with different spectral bands, and an evaluation unit that is configured to illuminate the detection zone by means of the illumination unit during various illumination time windows in a respective different spectral band and to record image data from the detection zone by way of the light receiver in recording time windows, the light receiver being configured as a dual line receiver including a first line and a second line of light reception pixels, and the recording time window for the first line being different from that for the second line, the illumination unit preferably being configured for the illumination with at least two of the following spectral bands: red, green, blue, visible, infrared and ultraviolet, and the evaluation unit being configured to establish the recording time windows for at least one line in each case via two illumination time windows so that recording in each case takes place during the illumination first with one spectral band, and then with another spectral band.

A method for creating at least two images of a measuring object using a camera device is known from DE 10 2013 223 852 A1, wherein, in a first recording main step, an illumination unit is activated to illuminate the measuring object in a measuring area in a first illumination type and an image acquisition unit that comprises a surface sensor including multiple sensor lines, each of the sensor lines being able to record one image line of an object line, is activated to record a first measurement image with at least n sensor lines, the first measurement image including a first image line for each of the at least n sensor lines, wherein thereafter, in a first movement main step, a movement unit is activated for the relative displacement of the measuring object and the image acquisition unit by a path that corresponds to one object line or a plurality of the object lines, and wherein thereafter, in a second recording main step, the illumination unit is activated to illuminate the measuring area in a second illumination type, and the image acquisition unit is activated to record a second measurement image with the same at least n sensor lines, the second measurement image including a second image line for each of the at least n sensor lines, wherein thereafter, in a second movement main step, the movement unit is activated for the relative displacement of the measuring object by a path that corresponds to one or a plurality of the object lines, and thereafter a sequence comprising at least the first recording main step, the first movement main step, the second recording main step and the second movement main step being repeatedly activated, and an evaluation unit, based on the first measurement images, creating a first image with the first illumination type and, based on the second measurement images, creating a second image of the measuring object with the second illumination type.

An inline inspection system in a printing press is known from EP 1 607 220 A2, the inline inspection system comprising a line camera and an illumination unit, the line camera comprising, for example, a UV filter, serving as a lens cap, and it being possible for the illumination unit to comprise a group of white light emitting light sources.

SUMMARY

It is an object herein to create a method for photographically mapping an object and a printing press comprising a system for carrying out this method, comprising a control unit, by way of which an object can be efficiently checked by a machine for adherence to a certain quality level in an industrial production process.

The object is achieved in some examples by a method that includes the exposure device being exposed for an exposure time that is dependent on the duration of the on-time of the line camera. Each strip-shaped portion of the object to be photographically mapped being exposed, within the recording period photographically mapping the portion, during the duration of the on-time of the line camera asynchronously for the duration of a first exposure time to white light and for the duration of a second exposure time either to ultraviolet light or to IR light. Each strip-shaped portion of the print image to be photographically mapped is alternately exposed by the exposure device, within the recording period photographically mapping the portion, to white light and either to UV light or to IR light during the duration of the on-time of the line camera. Each strip-shaped portion of the print image to be photographically mapped is, in each case, exposed within the recording period photographically mapping the portion, during the duration of the on-time of the line camera for the duration of the second exposure time in each case to UV light, in the case of a UV-reactive image element or a UV-reactive security feature, or in each case to IR light, in the case of an IR-reactive image element or an IR-reactive security feature.

The object is further achieved in some examples by a printing press comprising a system, comprising a control unit configured to carry out the method, and in which the exposure device in the same housing, in addition to a light source for exposing the printing substrate to white light, additionally comprises a light source for exposing the printing substrate to UV light and/or a light source for exposing the printing substrate to IR light. The light source for exposing the printing substrate to white light and the light source for exposing the printing substrate to UV light and/or the light source for exposing the printing substrate to IR light is asynchronously and intermittently activated by the control unit during the duration of the on-time of the line camera.

The respective dependent claims in each case relate to advantageous embodiments and/or refinements of the identified solution.

The advantages to be achieved with the invention are, in particular, that the process of checking in particular value documents, preferably banknotes, for adherence to a certain quality level and/or for authenticity in an industrial print production process can be improved. It is particularly advantageous that different optical properties of a value document or of a print image, which, in addition to at least one image element that is printed with a printing ink visible to the human eye, includes at least one further image element that is printed by means of a UV-reactive printing ink or with an IR-reactive printing ink, and/or which in each case includes at least one UV-reactive or IR-reactive security feature in the relevant print image and/or in the printing substrate, can be jointly checked inline, i.e., during ongoing production.

BRIEF DESCRIPTION OF THE DRAWINGS

An exemplary embodiment of the invention is illustrated in the drawing and will be described in greater detail below.

The FIGURE shows a diagram for controlling an exposure device.

DETAILED DESCRIPTION

Value documents, such as banknotes, are generally produced in an industrial print production process in that at least one print image, preferably multiple print images, and in particular multiple identical print images, are printed onto a, for example sheet-format, printing substrate in a printing press, preferably in a rotary printing press. The relevant print image can include both image elements that are printed with a printing ink that is visible to the human eye, and image elements that are printed with a UV-reactive printing ink or with an IR-reactive printing ink. Moreover, in particular value documents can include at least one UV-reactive security feature or an IR-reactive security feature, for example in the print image and/or in the printing substrate of the relevant value document. An image element that has been printed with a UV-reactive printing ink and/or a UV-reactive security feature, however, cannot be photographically mapped by exposure to white light. A UV-reactive image element and/or a UV-reactive security feature each require energetic excitation from the outside to become visible to the human eye, in particular by irradiation with UV light, so that such an image element or such a security feature becomes visible to the human eye based on fluorescence or phosphorescence. An IR-reactive image element or an IR-reactive security feature also cannot be readily photographically mapped by way of a camera configured for white light images. The reason is that an IR-reactive image element or an IR-reactive security feature is also initially not visible to the human eye when exposed to white light alone. Only by exposure to IR light does an IR-reactive image element or an IR-reactive security feature trigger a reaction that is photographically detectable by way of a camera configured for white light images, in that the IR-reactive image element or the IR-reactive security feature in each case generally absorb and/or reflect the incident IR light and, as a result, in each case then appear as a dark area under white light, in particular compared to their respective immediate surroundings.

So as to efficiently check the adherence of these print images to a certain quality level by way of a machine in an industrial print production process, in general each print image that is printed onto the printing substrate is photographically mapped while the printing substrate is still being transported through the printing press, that is, inline. This photographic mapping of the at least one print image takes place at a fixed position within the printing press, in particular by means of at least one camera configured as a line camera, in a sequence of recording periods that each include at least one image line, the at least one line camera being switched on within each recording period by a control unit for a defined on-time. Each image line photographically maps a respective strip-shaped portion of the print image extending transversely to the transport direction of the printing substrate. Each strip-shaped portion of the relevant print image to be photographically mapped is exposed for an exposure time that is dependent on the respective on-time of the at least one line camera by an exposure device, which extends transversely to the transport direction of the printing substrate and is controlled by the control unit. In a preferred embodiment, the at least one line camera for creating the photographic map and the exposure device cooperating with the relevant line camera are directed at a transport path of the printing substrate that is transported through the printing press, and printed there in at least one printing unit, and are arranged on the same side of the printing substrate, the printing substrate including the print images printed thereon being transported lying flat on a transport device. This transport device is configured as a conveyor belt or as a transport cylinder, for example, the printing substrate including the print images printed thereon being transported lying flat on the outer cylindrical surface of the rotating transport cylinder. The relevant line camera, the exposure device and the control unit are each, for example, components of an inspection system belonging to the printing press.

According to the invention, the print image used is a print image which, in addition to at least one image element that is printed with a printing ink visible to the human eye, includes at least one further image element that is printed by means of a UV-reactive printing ink or with an IR-reactive printing ink, and/or which includes at least one UV-reactive security feature or an IR-reactive security feature, each strip-shaped portion of the print image to be photographically mapped being exposed, within the recording period photographically mapping the portion, during the on-time of the at least one line camera asynchronously, that is, not simultaneously, for the duration of a first exposure time to white light and for the duration of a second exposure time in each case to ultraviolet light, i.e., to UV light, in the case of a UV-reactive image element or a UV-reactive security feature, or in each case to IR light, in the case of an IR-reactive image element or an IR-reactive security feature. The duration of the first exposure time to white light and/or the duration of the second exposure time to UV light or to IR light can, for example, be variably set within a previously established value range by, or at least at, the control unit cooperating with the relevant line camera. For example, the duration of the first exposure time to white light is set to be shorter than the duration of the second exposure time to UV light or to IR light. The duration of the first exposure time to white light, for example, is less than half the duration of the second exposure time to UV light or to IR light. In any case, each, i.e., one and the same, strip-shaped portion of the print image to be photographically mapped is in each case exposed to at least two types of light within the recording period photographically mapping the portion. In particular, it is provided that each strip-shaped portion of the print image to be photographically mapped is alternately exposed to white light and to UV light or to IR light by the exposure device during the on-time of the at least one line camera, within the recording period photographically mapping the portion.

In an advantageous embodiment of the identified solution, an encoder or an absolute encoder, which is arranged in the printing press and has at least a data connection to the control unit, is used to switch on the exposure time to white light and/or to switch on the exposure time to UV light or to IR light, so that the exposure time to white light and/or the exposure time to UV light or to IR light in each case take place with a defined geographical relationship, as given by the encoder or absolute encoder, with respect to the printing substrate transported through the printing press.

It is also possible to use two line cameras arranged next to one another in the printing press, for example parallel, preferably transversely to the transport direction of the printing substrate, each strip-shaped portion of the print image to be photographically mapped being exposed, within the recording period photographically mapping the portion, by the exposure device during an on-time of the first line camera for the duration of the first exposure time to white light and, with time offset, i.e., at another time during an on-time of the second line camera, for the duration of the second exposure time to UV light or to IR light.

If only a single line camera is utilized, twice the number of image lines must be recorded to photographically map the relevant print image. The white light image recorded during the relevant recording period and the UV light image or IR light image are thereby nested inside one another and have to be separated subsequently from one another by a line demultiplexing method. If two line cameras that are arranged preferably parallel, i.e., next to one another transversely to the transport direction of the printing substrate, are used, this is not necessary. However, the points in time of the image line recording have to be adapted to the respective exposure device, i.e., to the respective time-offset exposure to white light and to UV light or IR light.

The FIGURE shows a diagram for controlling an exposure device used to carry out the described method. The printing substrate, e.g., configured as a sheet, arranged in a printing press comprising at least one printing unit, e.g., on the outer cylindrical surface of a transport cylinder, is guided through a strip-shaped recording area of the at least one line camera, this at least one line camera being arranged in a fixed manner in the printing press, in the transport direction of the printing substrate, downstream from the relevant printing unit printing this printing substrate. The transport direction of the printing substrate is indicated by a directional arrow in the FIGURE. The at least one print image printed onto the printing substrate is photographically mapped in a sequence of image lines extending transversely to the transport direction of the printing substrate, the line camera recording the relevant image line being switched on by its associated control unit for the duration T1 of a defined on-time EZ, which is, for example, dependent on the transport speed of the printing substrate. This on-time EZ of the relevant line camera last no longer than a recording period TA of this line camera controlled by the control unit. In each recording period TA, the relevant line camera photographically maps a respective strip-shaped portion of the print image extending transversely to the transport direction of the printing substrate.

As is apparent from the FIGURE, during the duration T1 of the on-time EZ of the relevant line camera, an exposure of the strip-shaped portion of the print image which extends transversely to the transport direction of the printing substrate takes place for the duration T2 of a first exposure time WS to white light, and in the shown example for the duration T3 of a second exposure time UV to UV light. The chronological sequence of the respective exposure can also be reversed than what is shown in the FIGURE, i.e., for the exposure to UV light to take place chronologically before the exposure to white light. In the example shown in the FIGURE, the exposure to white light and the exposure to UV light are carried out intermittently, preferably alternately. The same also applies to the variant embodiment using IR light. The respective exposure takes place in each case in particular by an exposure device, in which the different light type-emitting light sources are integrated, i.e., are arranged in the same housing so as to each be directed at the printing substrate, wherein in the preferred embodiment these different light sources are additionally arranged in a line arrangement, i.e., on a straight line extending transversely to the transport direction of the printing substrate, so that the exposure device is configured as a line exposure device. The light sources arranged in the exposure device are preferably each controlled by the control unit. These light sources are, e.g., controlled as a function of a signal of an encoder or absolute encoder arranged, for example, at the transport cylinder, wherein the transport cylinder, by way of its rotation, transports the printing substrate lying flat on its outer cylindrical surface through the strip-shaped recording area of the at least one line camera extending in the axial direction of this transport cylinder. The light sources of the exposure device are preferably each configured as LEDs or laser diodes.

This consequently also results in a system for carrying out the aforementioned method, comprising at least one line camera arranged in a printing press and an exposure device, the relevant line camera and the exposure device being arranged so as to be directed at a transport path of a printing substrate that is transported through the printing press and printed there in a printing unit, the exposure device in the same housing, and preferably on a straight line extending transversely to the transport direction of the printing substrate, in particular in an alternating arrangement, in addition to a light source for exposing the printing substrate to white light, additionally comprising a light source for exposing the printing substrate to UV light and/or a light source for exposing the printing substrate to IR light, the light source for exposing the printing substrate to white light and the light source for exposing the printing substrate to UV light and/or the light source for exposing the printing substrate to IR light being asynchronously and intermittently activated by a control unit. Moreover, the control unit is configured, for example by executing a corresponding control program, so as to control the relevant line camera and the exposure device in each case as a function of a signal of an encoder or absolute encoder arranged in the printing press.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A method for photographically mapping an object, the photographic mapping of the object taking place during its transport at a fixed position by means of a line camera in a sequence of recording periods that each include at least one image line; the line camera being switched on within each recording period by a control unit for a duration of a defined on-time; each image line photographically mapping a respective strip-shaped portion of the object extending transversely to the transport direction of the object; each strip-shaped portion of the object to be photographically mapped being exposed for an exposure time by an exposure device, which extends transversely to the transport direction of the object, is controlled by the control unit and is located on the same side of the printing substrate as the line camera; each strip-shaped portion of the object to be photographically mapped being exposed, within the recording period photographically mapping the portion, during the duration of the on-time of the line camera to white light or to UV light or to IR light; a print image that is applied onto a printing substrate in a printing press being used as the object; the photographic recording of the print image taking place while the printing substrate is being transported through the printing press; the print image, in addition to at least one image element that is printed with a printing ink visible to the human eye, including at least one further image element; this further image element being printed by means of a UV-reactive printing ink or by means of an IR-reactive printing ink, and/or the print image including at least one UV-reactive security feature or one IR-reactive security feature, characterized in that the exposure device is exposed for an exposure time that is dependent on the duration of the on-time of the line camera; each strip-shaped portion of the object to be photographically mapped being exposed, within the recording period photographically mapping the portion, during the duration of the on-time of the line camera asynchronously for the duration of a first exposure time to white light and for the duration of a second exposure time either to ultraviolet light or to IR light; each strip-shaped portion of the print image to be photographically mapped being alternately exposed by the exposure device, within the recording period photographically mapping the portion, to white light and either to UV light or to IR light during the duration of the on-time of the line camera; and each strip-shaped portion of the print image to be photographically mapped being in each case exposed, within the recording period photographically mapping the portion, during the duration of the on-time of the line camera for the duration of the second exposure time in each case to UV light, in the case of a UV-reactive image element or a UV-reactive security feature, or in each case to IR light, in the case of an IR-reactive image element or an IR-reactive security feature.

2. The method according to claim 1, characterized in that the duration of the first exposure time to white light and/or the duration of the second exposure time either to UV light or to IR light is or are set by the control unit; the duration of the first exposure time to white light and/or the duration of the second exposure time either to UV light or to IR light being variably settable within a previously established value range.

3. The method according to claim 1 characterized in that the duration of the first exposure time to white light is set to be shorter than the duration of the second exposure time either to UV light or to IR light.

4. The method according to claim 1, characterized in that an encoder or an absolute encoder, which is arranged in the printing press and has at least a data connection to the control unit, is used to switch on the exposure time to white light and/or to switch on the exposure time to UV light or to IR light, so that the exposure time to white light and/or the exposure time either to UV light or to IR light in each case takes place with a defined geographical relationship, as given by the encoder or absolute encoder, with respect to the printing substrate transported through the printing press.

5. The method according to claim 1, characterized in that, when using the sole single line camera, twice the number of image lines must be recorded to photographically map the relevant print image; as a result a white light image and a UV light image or an IR light image being recorded during the relevant recording period so as to be nested inside one another and being subsequently separated from one another by a line demultiplexing method.

6. The method according to claim 1, characterized in that the print image is photographically mapped while the printing substrate lies flat on a conveyor belt or on the outer cylindrical surface of a transport cylinder in the printing press.

7. The method according to claim 1, characterized by being used to check print images that are printed onto the printing substrate and form a respective value document or a banknote.

8. A printing press comprising a system comprising a control unit; the control unit of this system being configured to carry out the method according to claim 1, the system comprising a line camera arranged in a printing press and an exposure device; the line camera and the exposure device being directed at a transport path of a printing substrate, which is being transported through the printing press and printed there in at least one printing unit, and being arranged on the same side of this printing substrate, characterized in that the exposure device in the same housing, in addition to a light source for exposing the printing substrate to white light, additionally comprises a light source for exposing the printing substrate to UV light and/or a light source for exposing the printing substrate to IR light; the light source for exposing the printing substrate to white light and the light source for exposing the printing substrate to UV light and/or the light source for exposing the printing substrate to IR light being asynchronously and intermittently activated by the control unit during the duration of the on-time of the line camera.

9. The printing press according to claim 8, characterized in that the control unit is configured so as to control the relevant line camera and the exposure device in each case as a function of a signal of an encoder or absolute encoder arranged in the printing press.

10. The printing press according to claim 8, characterized in that a transport device transporting the printing substrate through the printing press is provided, this transport device being configured as a conveyor belt or as a transport cylinder.

11. The printing press according to claim 8, characterized in that the light sources of the exposure device are each arranged on a straight line extending transversely to the transport direction of the printing substrate.

12. The printing press according to claim 8, characterized in that the light sources of the exposure device are each configured as LEDs or laser diodes.

* * * * *